United States Patent
Honobe

(10) Patent No.: US 7,242,649 B2
(45) Date of Patent: Jul. 10, 2007

(54) SYNCHRONIZATION CIRCUIT FOR OPTICAL DISC APPARATUS AND SYNCHRONIZATION METHOD FOR OPTICAL DISC APPARATUS

(75) Inventor: Yuzuru Honobe, Saitama-ken (JP)

(73) Assignee: Sanyo Electric Co., Ltd, Osaka (JP)

( * ) Notice: Subject to any disclaimer, the term of this patent is extended or adjusted under 35 U.S.C. 154(b) by 547 days.

(21) Appl. No.: 10/891,532

(22) Filed: Jul. 14, 2004

(65) Prior Publication Data

US 2005/0013219 A1    Jan. 20, 2005

(30) Foreign Application Priority Data

Jul. 15, 2003    (JP)    ............... 2003-197070

(51) Int. Cl.
  *G11B 7/00*    (2006.01)
(52) U.S. Cl. ............... 369/47.1; 369/47.14; 369/47.28; 369/47.48
(58) Field of Classification Search ............... 369/47.1, 369/47.14, 47.28, 47.27, 53.12, 53.15, 53.17, 369/53.32
See application file for complete search history.

(56) References Cited

U.S. PATENT DOCUMENTS 5,089,900 A * 2/1992 Yokogawa .................. 386/87

FOREIGN PATENT DOCUMENTS

JP    10-208244    8/1998

* cited by examiner

*Primary Examiner*—Nabil Hindi
(74) *Attorney, Agent, or Firm*—SoCal IP Law Group LLP; Steven C. Sereboff

(57) ABSTRACT

A synchronization circuit for an optical disc apparatus, which performs synchronization operation based on a playback signal of an optical disc, the circuit comprises a playback signal recovery timing detection circuit that detects timing corresponding to the recovery of the playback signal for a defect signal from a defect signal detection circuit, a delay counter that counts frame synchronization signals from timing at which loss of recorded data on the optical disc is not detected by the defect signal detection circuit, a delay determining circuit that determines whether a count of the frame synchronization signals by the delay counter has reached a predetermined delay count, and a circuit that starts the synchronization operation when informed by the delay determining circuit to the effect that the count of the frame synchronization signals has reached the predetermined delay count.

4 Claims, 5 Drawing Sheets

SYNCHRONIZATION CIRCUIT FOR OPTICAL DISC APPARATUS AND SYNCHRONIZATION METHOD FOR OPTICAL DISC APPARATUS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright the trade dress rights whatsoever.

RELATED APPLICATION INFORMATION

The present application claims priority upon Japanese Patent Application No. 2003-7070 filed on Jul. 15, 2003, which is herein incorporated by reference.

BACKGROUND OF THE INVENTION

1. Field of the Invention

The present invention relates to a synchronization circuit for optical disc apparatuses and a synchronization method for optical disc apparatuses.

2. Description of the Related Art

Various recording media and recording/playback apparatuses associated therewith have been developed, and compact disc (CD) systems, mini-disc (MD) systems, DVD (Digital Video Disc/Digital Versatile Disc) systems, and the like are known. A recording/playback apparatus in such disc systems is provided with a defect signal detection circuit (or simply called a defect circuit) so that failures in playback operation and/or the quality of playback sound do not occur due to scratches or stains on a disc. Refer to, for example, Japanese Patent Application Laid-open Publication No. 10 208244. As shown in FIGS. 1 and 7 of the foregoing Publication, the defect signal detection circuit detects physical defects such as scratches or stains on a disc and the drop-out (loss) of recorded data due to, for example, an operation error when recording (hereinafter, generically called "defects") by using information obtained from the disc by the optical head. A defect signal is output as a signal indicating the detection result, and based on the defect signal, a predetermined defect handling process is performed in, for example, the decoder performing playback signal processing or the servo system circuit. By this means, interruptions to playback voice and failure occurrence in servo operation are prevented.

In performing the above-mentioned defect handling process, the defect signal detection circuit outputs a defect signal that is at, for example, "HIGH" during the time when the playback RF signal is lost (drop-out) due to a defect as shown in FIG. 9 of the above Publication. By this means, a synchronization detection circuit prohibits the detection of frame synchronization signals during the time when the defect signal is output, and resumes the detection of frame synchronization signals when the defect signal ceases to be output.

However, in a conventional synchronization detection circuit, for some time after the defect signal falls from "HIGH", the playback RF signal has not yet fully recovered and is still in a transient state. If in the transient state of the playback RF signal, the detection of frame synchronization signals is resumed, genuine correct frame synchronization signals cannot be obtained, and thus the desired defect handling process cannot be performed.

SUMMARY OF THE INVENTION

One aspect of the present invention is a synchronization circuit for an optical disc apparatus, which performs synchronization operation based on a playback signal of an optical disc, the circuit comprising a playback signal recovery timing detection circuit that detects timing corresponding to the recovery of the playback signal for a defect signal from a defect signal detection circuit, a delay counter that counts frame synchronization signals from timing at which detection of loss of data recorded on the optical disc by the defect signal detection circuit is ceased, a delay determining circuit that determines whether a count of the frame synchronization signals by the delay counter has reached a predetermined delay count, and a circuit that starts the synchronization operation when informed by the delay determining circuit to the effect that the count of the frame synchronization signals has reached the predetermined delay count.

Another aspect of the present invention is a synchronization method for an optical disc apparatus, which performs synchronization operation based on a playback signal of an optical disc, the method comprising, detecting timing corresponding to the recovery of the playback signal for a defect signal from a defect signal detection circuit, counting frame synchronization signals from timing at which detection of loss of data recorded on the optical disc by the defect signal detection circuit is ceased, determining whether a number of the frame synchronization signals counted has reached a predetermined delay count, and starting the synchronization operation when the count of the frame synchronization signals has reached the predetermined delay count.

Hence, the synchronization operation is started after the predetermined delay count has been reached from timing corresponding to the recovery of the playback signal for the defect signal. Thus, precise synchronization operation can be performed, so that the desired defect handling process becomes possible.

Features and objects of the present invention other than the above will become clear by reading the description of the present specification with reference to the accompanying drawings.

DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1:
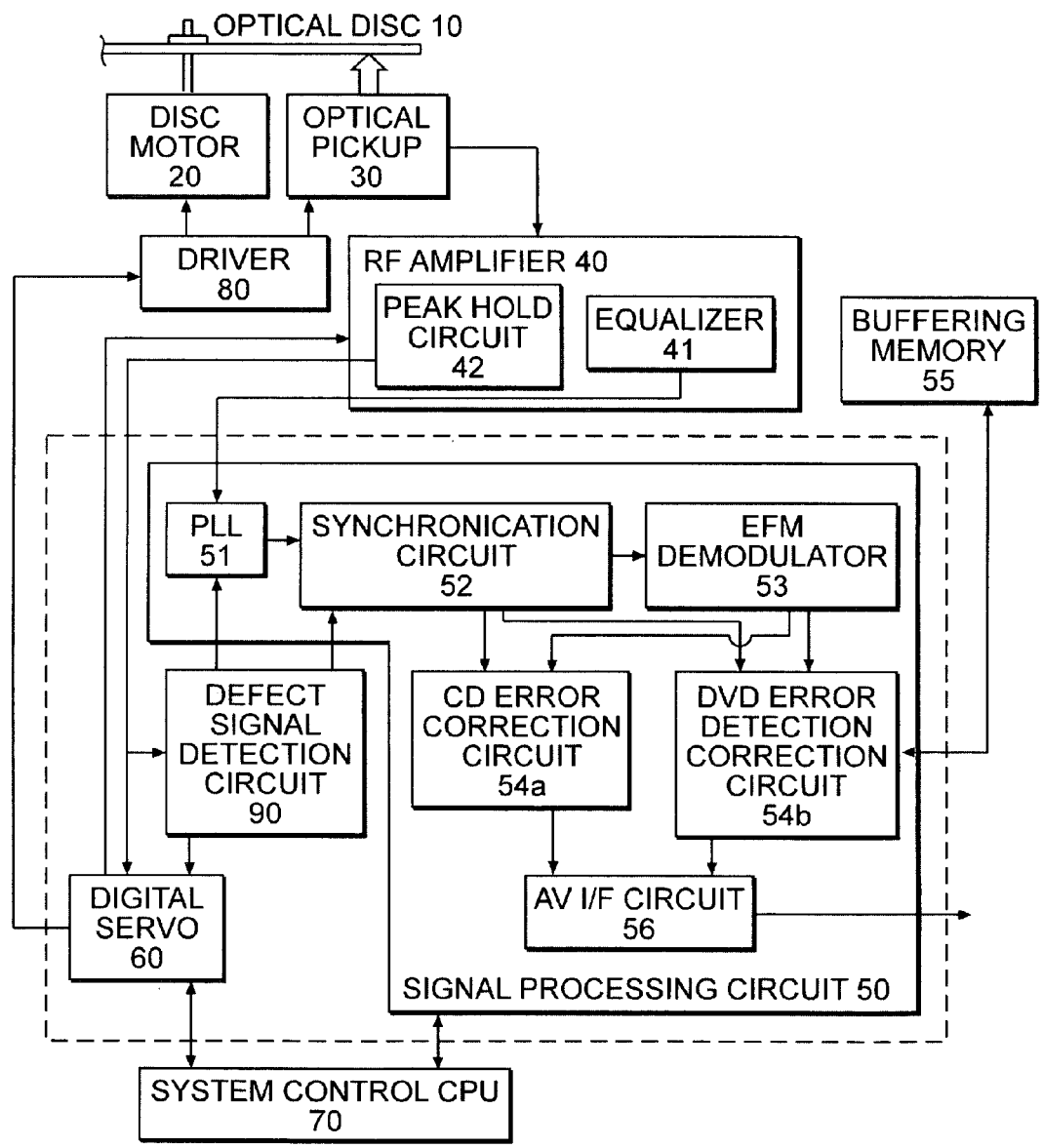
FIG. 1 is a block diagram of an optical disc recording/playback apparatus according to an embodiment of the present invention.

At least the following matters will be made clear by the explanation in the present specification and the description of the accompanying drawings.

Recording/Playback Apparatus

First, an optical disc recording/playback apparatus will be described with reference to the block diagram of FIG. 1. An optical disc 10 having data of video image or voice recorded is rotationally driven by a disc motor (spindle motor) 20, while irradiated by an optical pickup 30 with laser light in recording and playback. The disc motor 20 is driven by a driver 80 under the control of a digital servo control circuit 60 according to instructions from a system control CPU 70. The optical pickup 30 detects the reflected light and outputs to an RF amplifier 40. The RF amplifier 40 amplifies the output signal from the optical pickup 30 to produce a playback signal. The playback signal is equalized by an equalizer 41 and output to a synchronization circuit 52 via a PLL 51 of a signal processing circuit 50. The synchronization circuit 52 obtains a data series and a data clock based on the input playback signal to generate a frame synchronization signal. That is, a synchronization pattern constituted by a predetermined bit sequence (32 bits for a DVD standard) is attached in the head of each frame of the data series played back. By detecting this synchronization pattern, a synchronization signal is generated, and by detecting this synchronization signal with a detection window, a frame synchronization signal is generated. The data series generated by the synchronization circuit 52 is input into and demodulated by an EFM demodulation circuit 53. The demodulated data is sent to a CD error detection correction circuit 54a or a DVD error detection correction circuit 54b, which performs error correction thereon using a buffering memory 55. This error corrected data is output to the outside via an AV I/F circuit 56. These operations are controlled by the system control CPU 70.

Meanwhile, a PH (peak hold) signal from a peak hold circuit 42 is input to a defect signal detection circuit 90. The defect signal detection circuit 90 outputs the defect signal to the digital servo 60, PLL 51, and synchronization circuit 52. Used as this defect signal detection circuit 90 can be various known configurations such as that illustrated in FIG. 7 of Japanese Patent Application Laid-open Publication No. 10 208244 mentioned above in the description of the related art and that described in Japanese Patent Application Laid-open Publication No. 8 96361.

Synchronization Circuit

Overall Configuration and Operation

Figure 2A:
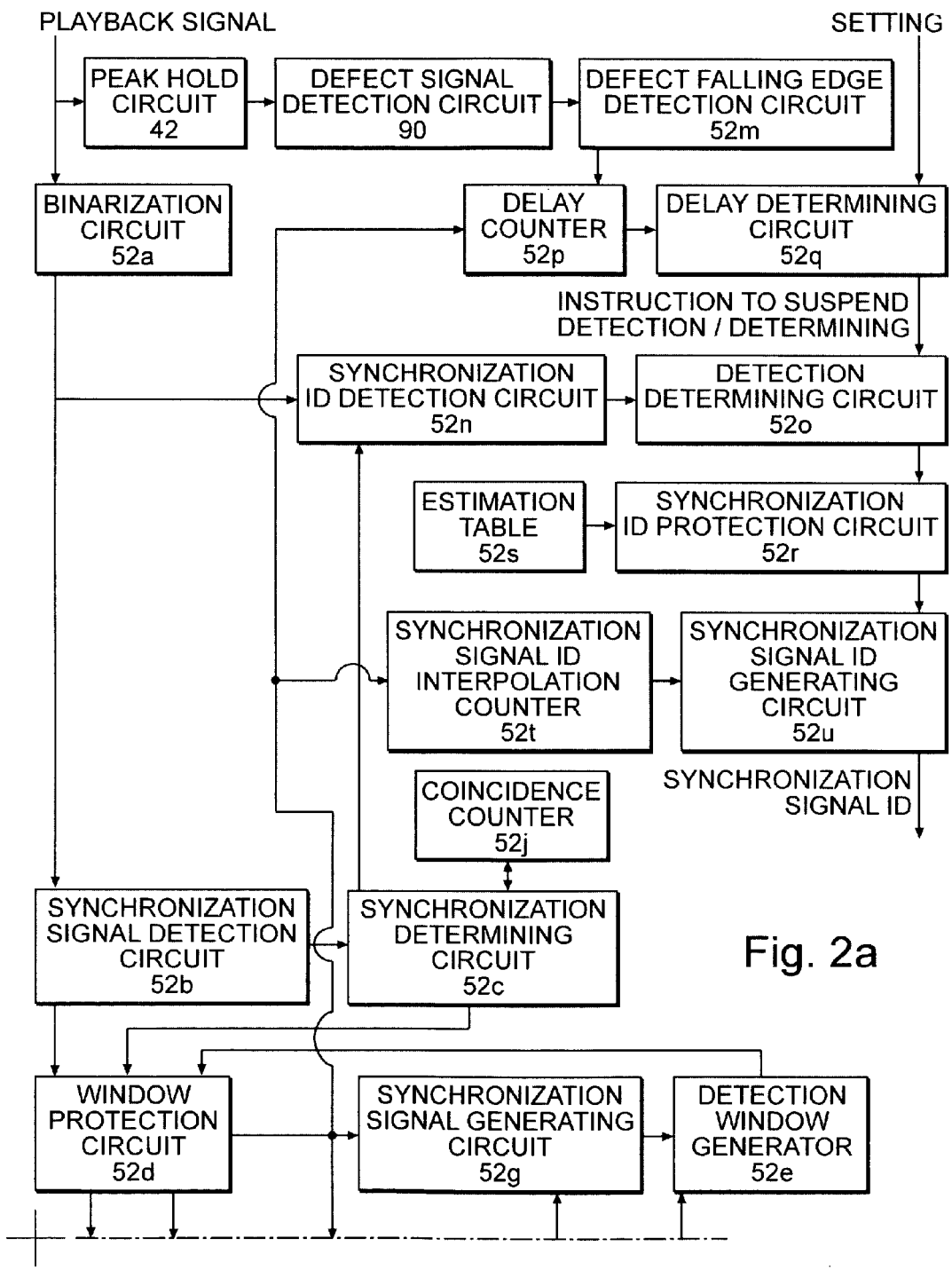
FIGS. 2a and 2b are block diagrams showing a specific example of the configuration of a synchronization circuit according to the present embodiment.
Figure 2B:
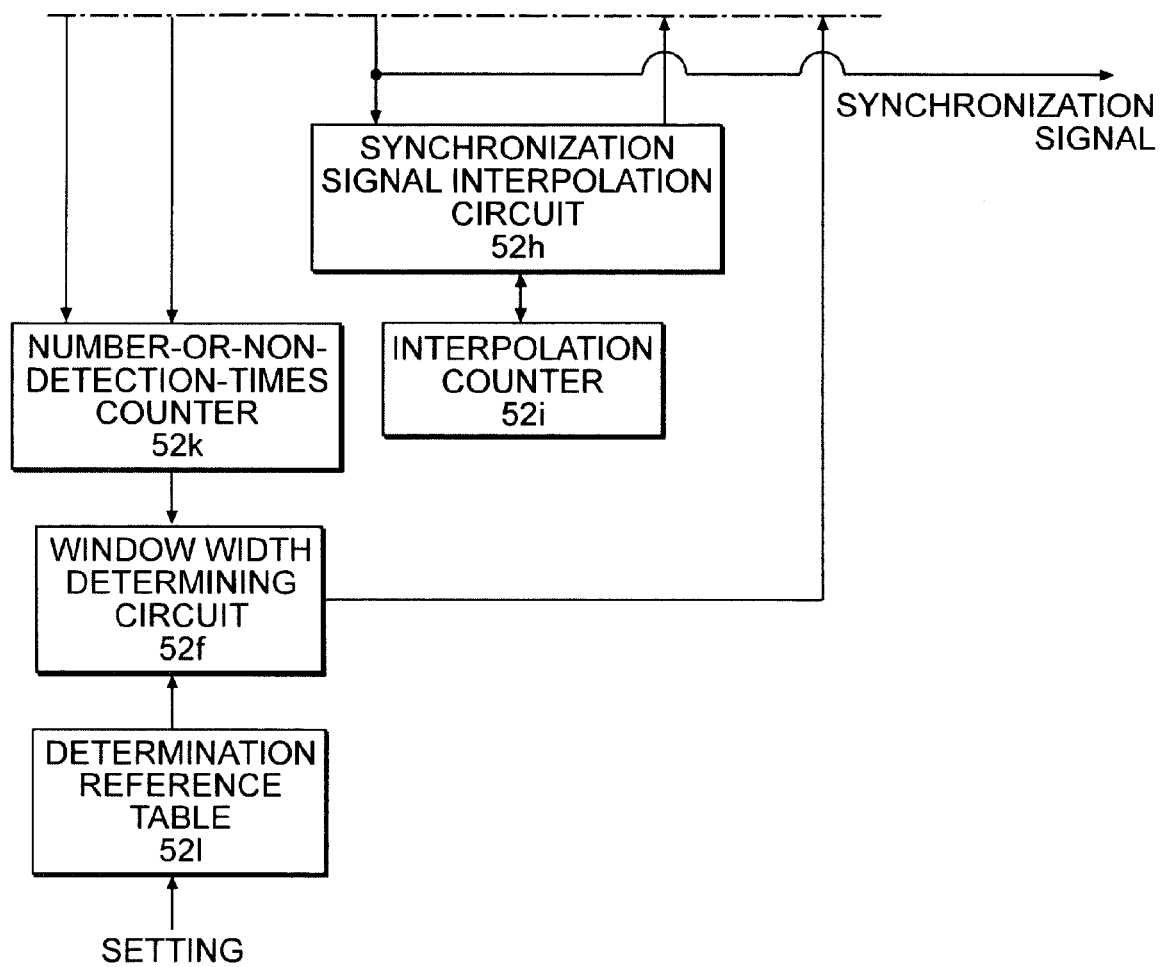

A specific example of the configuration of the synchronization circuit 52 is shown in the block diagram of FIG. 2. For the sake of convenience, the peak hold circuit 42 and the defect signal detection circuit 90 of FIG. 1 are also shown in FIG. 2 together therewith. The playback signal inputted to the synchronization circuit 52 is inputted to a binarization circuit 52a to obtain a data series. This data series is input to the synchronization signal detection circuit 52b to detect the synchronization pattern. The synchronization signal generated by detecting this synchronization pattern is sent to a synchronization determining circuit 52c. The synchronization determining circuit 52c determines whether synchronization signals are consecutively detected. When the count value of a coincidence counter 52j that counts the number of consecutive times to detect a synchronization signal reaches a predetermined value, having shifted from a full open state to a synchronized state, the synchronization determining circuit 52c sends a signal indicating to that effect to a window protection circuit 52d.

The synchronization signals from the synchronization signal detection circuit 52b are also input to the window protection circuit 52d. A detection window is sent from a detection window generating circuit 52e to the window protection circuit 52d, and when a synchronization signal exists within the detection window, this synchronization signal is taken as a frame synchronization signal. The detection window generating circuit 52e starts a detection window after a predetermined number of clocks have elapsed from the frame synchronization signal, and holds the detection window only for a predetermined time specified by information given from a window width determining circuit 52f. Thus, when the preceding frame synchronization signal deviates forwards or backwards, the start of the detection window next to the preceding one also deviates forwards or backwards.

The frame synchronization signal generated in this way is sent to a synchronization signal generating circuit 52g. A data series is sent to the synchronization signal generating circuit 52g from the synchronization signal detection circuit 52b via the window protection circuit 52d. The synchronization signal generating circuit 52g generates a synchronization signal from the data series based on the frame synchronization signal and outputs to the EFM demodulation circuit 53 at the next stage.

Furthermore, this synchronization signal is sent to a synchronization signal interpolation circuit 52h and provided for an interpolation counter 52i generating an interpolation synchronization signal. This interpolation synchronization signal is a pseudo synchronization signal generated after a predetermined number of clocks elapse from the preceding frame synchronization signal. This interpolation synchronization signal is sent to the synchronization signal generating circuit 52g and is used as a compensation synchronization signal if a synchronization signal is not detected within a detection window.

The relationships between these interpolation synchronization signal, synchronization signal, and frame synchronization signal will be explained. When a synchronization signal is not detected within a detection window, an interpolation synchronization signal is output as a frame synchronization signal. Furthermore, when a synchronization signal is detected prior to an interpolation synchronization signal, the synchronization signal is output as a frame synchronization signal. Moreover, when an interpolation synchronization signal is input prior to the detection of a synchronization signal, the interpolation synchronization signal is output as a frame synchronization signal, and subsequently the synchronization signal is output as a frame synchronization signal. In this case, the preceding output frame synchronization signal (compensation synchronization signal based on the interpolation synchronization signal) is reset by the later output frame synchronization signal (frame synchronization signal based on the synchronization signal).

Meanwhile, when a synchronization signal from the synchronization signal detection circuit 52b is not detected in a detection window, the window protection circuit 52d sends information to that effect to a number-of-non-detection-times counter 52k to count the number of non-detection times. On the other hand, when a synchronization signal from the synchronization signal detection circuit 52b is detected in a detection window, the window protection circuit 52d sends information to that effect to the number-of-non-detection-times counter 52k to reset the count data. The count value of the number-of-non-detection-times counter 52k is sent to the window width determining circuit 52f each time counted.

The window width determining circuit 52f compares the value sent from the number-of-non-detection-times counter 52k with reference data of a determination reference table 52l to compare them in greatness. That is, it determines whether the number of non-detection times has reached a predetermined setting value. As a result of this determining, when it is found that the number of non-detection times has reached the predetermined setting value, information about a window width corresponding to this setting value is sent to the detection window generating circuit 52e. By this means, the detection window generating circuit 52e outputs detection windows having the altered width to the window protection circuit 52d from the next time on. When, for example, four non-detection times occur consecutively, the detection window width is controlled to be widened from the fifth time on. Subsequently, when non-detection times further occur consecutively, the detection window width is controlled to be widened according to the number of consecutive non-detection times. For such control, the numbers of consecutive non-detection times and the detection window widths corresponding thereto are prepared in the determination reference table 52l beforehand, and when, upon comparing the count of the number-of-non-detection-times counter 52k with a setting value (number of non-detection times), they coincide, information about the detection window width corresponding to the coinciding number of consecutive non-detection times is sent to the detection window generating circuit 52e. Then, the detection window generating circuit 52e generates detection windows having the obtained width.

Note that the above setting value (number of non-detection times) can be determined taking into account the error correction capability (a maximum of 32 frames for the DVD standard) of the CD error detection correction circuit 54a or DVD error detection correction circuit 54b at the later stage (FIG. 1). Furthermore, in this synchronization circuit, the determination reference table 52l is so configured that setting values can be entered externally, and thus they can be set to optimum values as needed.

Delay Circuit for Synchronization Detection and its Operation

Figure 3:
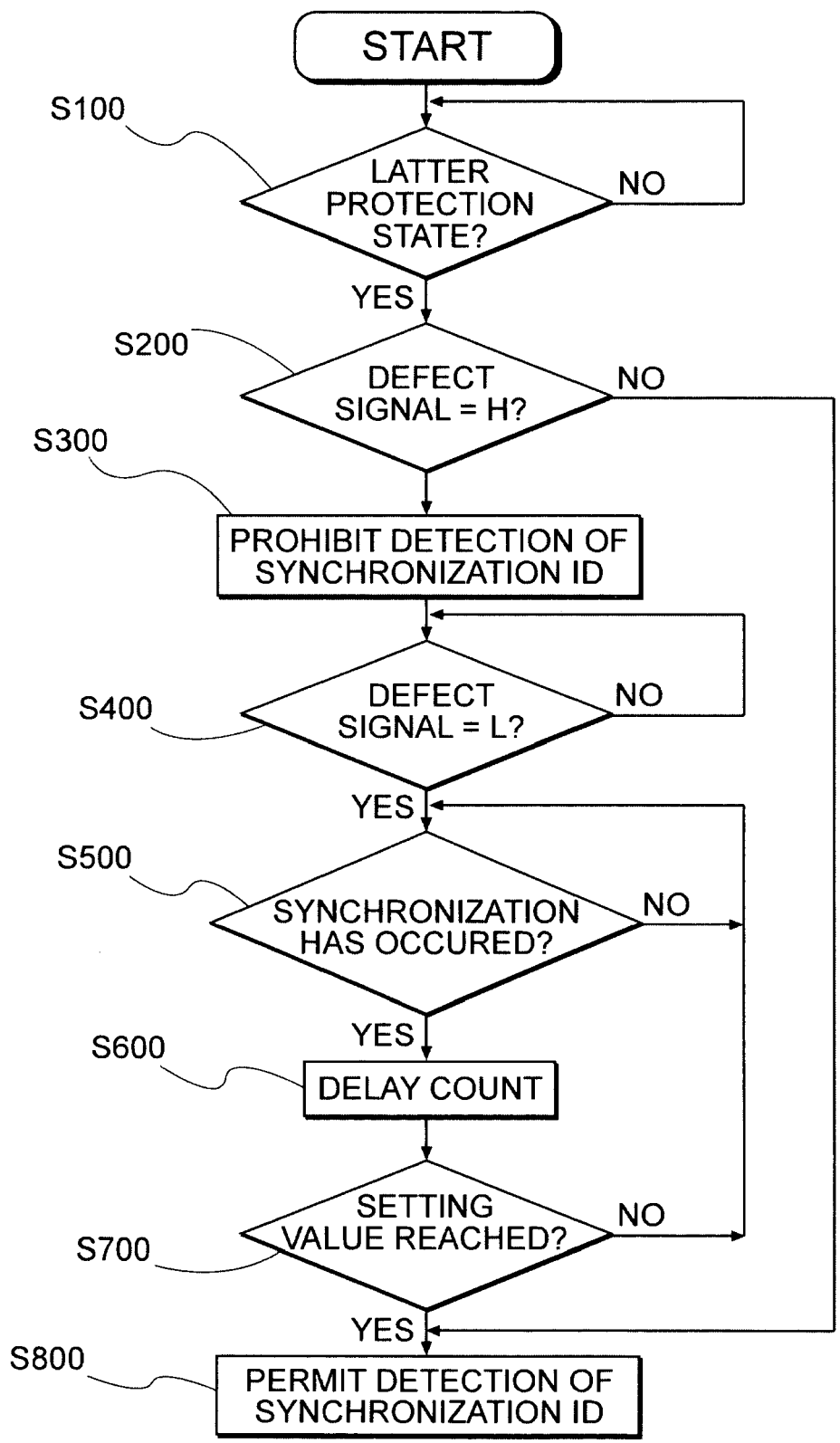
FIG. 3 is a flow chart showing delay operation of synchronization detection according to the present embodiment.
Figure 4:
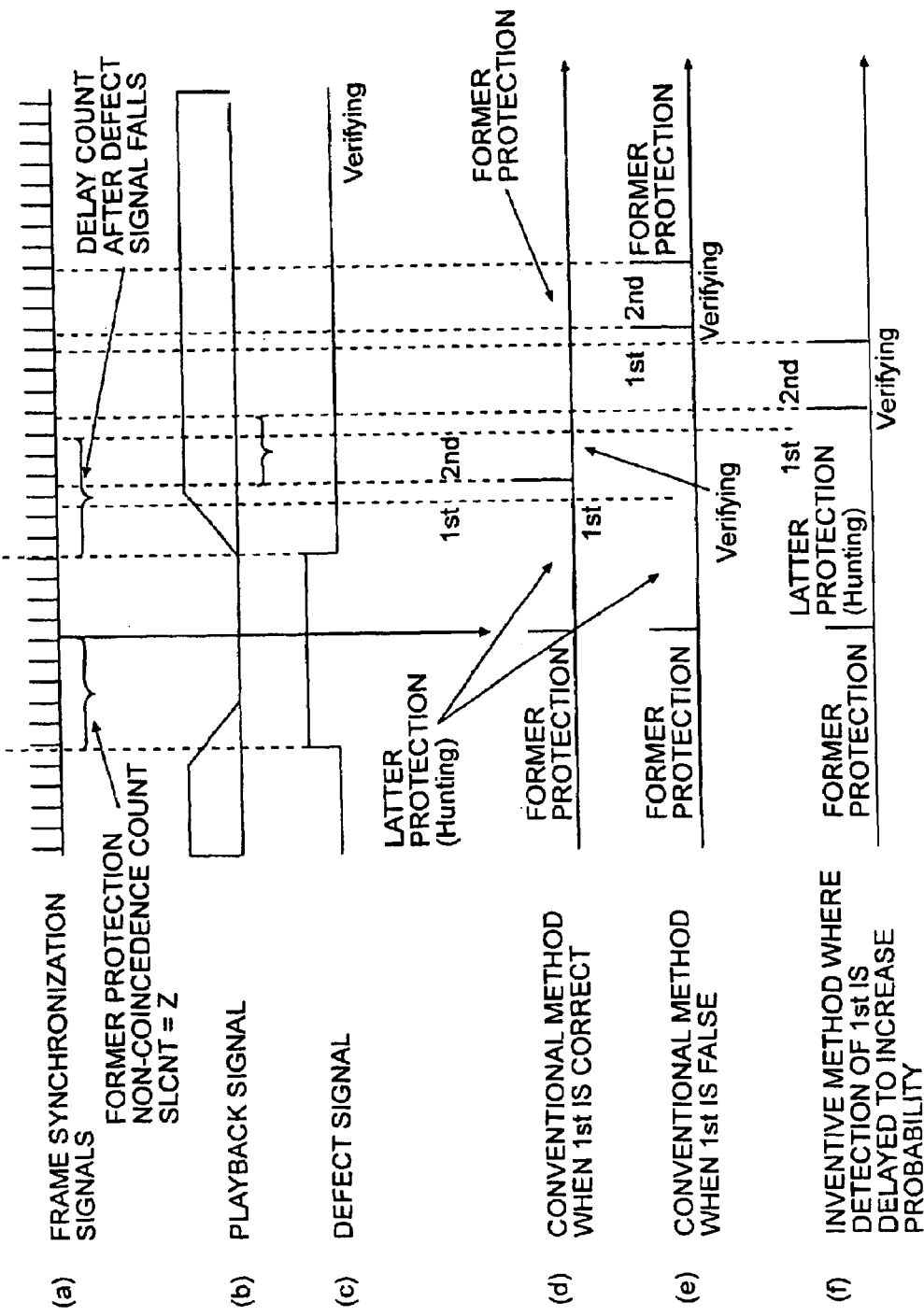
FIG. 4 is a time chart showing the delay operation of the synchronization detection according to the present embodiment

In order to generate precise frame synchronization signals after the occurrence of a defect, the synchronization detection operation is performed with a delay after the defect signal is detected. The delay operation of synchronization detection will be explained with reference to the block diagram of FIG. 2 previously shown, the flow chart of FIG. 3, and the time chart of FIG. 4. A description will be made below following the flow chart of FIG. 3. The synchronization circuit 52 of FIG. 2 previously shown confirms whether being in a latter protection state (refer to the state transition chart of FIG. 4(f)), and if being in the latter protection state (S100: YES), a defect falling edge detection circuit (playback signal recovery timing detection circuit) 52m of FIG. 2 detects whether the defect signal from the defect signal detection circuit 90 is at "H" (S200). That is, when the loss of the playback signal as shown in FIG. 4(b) starts to be indicated in the waveform, the defect signal becomes "H" as shown in the waveform diagram of the defect signal of FIG. 4(c). If the defect signal is not at "H" (S200: NO), the detection of a synchronization ID is allowed (S800). This synchronization ID is a code at the head of a synchronization code in the data series obtained from the binarization circuit 52a of FIG. 2. When the detection of a synchronization ID is allowed (S800), a synchronization ID detection circuit 52n (a circuit to start synchronization operation) of FIG. 2 attempts to detect a synchronization ID and sends the result to a detection determining circuit 52o. When the detection determining circuit 52o determines that a synchronization ID has been detected, in order to confirm whether the synchronization ID is authentic, a synchronization ID protection circuit 52r confirms the authenticity of a first ID and a second ID incoming sequentially as a synchronization ID referring to a preset estimation table 52s. When the detection determining circuit 52o determines that a synchronization ID has not been detected, a synchronization signal ID interpolation counter 52t sends an interpolated ID value to a synchronization signal ID generating circuit 52u to become a synchronization signal ID. When the synchronization ID protection circuit 52r determines that the detected ID is authentic, the synchronization signal ID generating circuit 52u adopts the detected ID as an ID value.

On the other hand, if the defect signal is at "H" (S200: YES), the detection of a synchronization ID is prohibited (S300), and the synchronization circuit 52 waits for the defect signal to change to "L" (S400). When the defect falling edge detection circuit 52m of FIG. 2 detects that the defect signal has fallen from "H" to "L" (that is, the recovery of the playback signal of FIG. 4(b)) as shown in the waveform diagram of the defect signal of FIG. 4(c) (S400: YES), a delay counter 52p, having confirmed that a frame synchronization signal has occurred, counts up at the frame synchronization signal (refer to the frame synchronization signal waveform of FIG. 4(a)) to measure the time from when the defect signal has fallen to "L" (S500, S600). A delay determining circuit 52q determines whether the counting result has reached a delay setting value (delay count) (S700), and if having reached the delay setting value (S700: YES), the process proceeds to the above-mentioned S800, where the detection of a synchronization ID starts and the authenticity confirmation of a first ID and a second ID incoming sequentially as a synchronization ID is performed. On the other hand, until the counting result reaches the delay setting value, the processes of the above-mentioned S500 through S700 are repeated.

In the above processes, the detection of a synchronization ID is prohibited from when the defect signal fell until the count of the delay counter 52p reaches the predetermined delay setting value. Thus, after the waveform of the playback signal of FIG. 4(b) certainly rises to such a level that it is not at all subject to the effect of the defect, synchronization operation such as the detection of a synchronization ID is performed as shown in FIG. 4(f). Hence, correct frame synchronization signals can be obtained, thereby enabling desired defect handling.

In contrast, in a conventional synchronization method, as shown in the state transition charts of FIGS. 4(d) and 4(e), during the transient time when the waveform of the playback signal of FIG. 4(b) is rising, the detection of a synchronization ID starts. As a result, one of two cases, either the case where a first can be correctly acquired as shown in FIG. 4(d) or the case where the first is missed as shown in FIG. 4(e), occurs each time and hence synchronization signals cannot be obtained stably.

Although the present invention has been specifically described based on an embodiment thereof, not being limited to this, various changes can be made thereto without departing from the scope thereof.

It is claimed:

1. A synchronization circuit for an optical disc apparatus, which performs synchronization operation based on a playback signal of an optical disc, the circuit comprising:
   a playback signal recovery timing detection circuit that detects timing corresponding to a recovery of the playback signal for a defect signal from a defect signal detection circuit;
   a delay counter that counts frame synchronization signals from timing at which loss of recorded data on the optical disc is not detected by the defect signal detection circuit;
   a delay determining circuit that determines whether a count of the frame synchronization signals by the delay counter has reached a predetermined delay count; and
   a circuit that starts the synchronization operation when informed by the delay determining circuit to the effect that a number of the frame synchronization signals counted has reached the predetermined delay count.

2. The synchronization circuit for an optical disc apparatus according to claim 1, wherein the delay counter counts the frame synchronization signal after generation of the frame synchronization signal has been confirmed.

3. The synchronization circuit for an optical disc apparatus according to claim 1, wherein
   the defect signal is a binarized signal which becomes one logical value when loss of the recorded data on the optical disc is detected,
   the timing is a timing at which the defect signal changes from one logical value to another logical value.

4. A synchronization method for an optical disc apparatus, which performs synchronization operation based on a playback signal of an optical disc, the method comprising:
   detecting timing corresponding to a recovery of the playback signal for a defect signal from a defect signal detection circuit;
   counting frame synchronization signals from timing at which loss of recorded data on the optical disc is not detected by the defect signal detection circuit;
   determining whether a number of the frame synchronization signals counted has reached a predetermined delay count; and
   starting the synchronization operation when the count of the frame synchronization signals has reached the predetermined delay count.

* * * * *